US011772191B2

(12) United States Patent
Fukasawa

(10) Patent No.: US 11,772,191 B2
(45) Date of Patent: Oct. 3, 2023

(54) SUBSTRATE PROCESSING APPARATUS AND METHOD

(71) Applicant: Samsung Display Co., LTD., Yongin-si (KR)

(72) Inventor: Takayuki Fukasawa, Seoul (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 432 days.

(21) Appl. No.: 17/036,701

(22) Filed: Sep. 29, 2020

(65) Prior Publication Data

US 2021/0121979 A1  Apr. 29, 2021

(30) Foreign Application Priority Data

Oct. 24, 2019  (KR) .................. 10-2019-0133213

(51) Int. Cl.
*B23K 26/06* (2014.01)
*B23K 26/14* (2014.01)
*B23K 26/362* (2014.01)
*B23K 101/36* (2006.01)

(52) U.S. Cl.
CPC .......... *B23K 26/0661* (2013.01); *B23K 26/14* (2013.01); *B23K 26/362* (2013.01); *B23K 2101/36* (2018.08)

(58) Field of Classification Search
CPC .. B23K 26/0661; B23K 26/14; B23K 26/362; B23K 2101/36
USPC ................................... 219/121.68
See application file for complete search history.

(56) References Cited

U.S. PATENT DOCUMENTS

| 4,713,537 A | * | 12/1987 | Kunz ................... B23K 26/042 |
| | | | 250/252.1 |
| 4,764,485 A | * | 8/1988 | Loughran ............ B23K 26/361 |
| | | | 438/945 |
| 5,221,426 A | * | 6/1993 | Tessier .............. H01L 21/32131 |
| | | | 438/669 |
| 5,728,994 A | * | 3/1998 | Hutton .................. B23K 26/57 |
| | | | 430/7 |

(Continued)

FOREIGN PATENT DOCUMENTS

| JP | 8-141765 | 6/1996 |
| JP | 9-300628 | 11/1997 |

(Continued)

OTHER PUBLICATIONS

Pissadakis et al. (Sub-micron periodic structuring of sapphire by laser induced backside wet etching technique, 2007) (Year: 2007).*

(Continued)

*Primary Examiner* — Jimmy Chou
(74) *Attorney, Agent, or Firm* — KILE PARK REED & HOUTTEMAN PLLC

(57) ABSTRACT

A method of processing a substrate includes placing a mask on a top surface of a processing substrate, the mask including openings, placing a cover substrate on the mask, the cover substrate overlapping the openings of the mask, placing the processing substrate on a vessel that accommodates an etching solution, and irradiating a beam onto the top surface of the processing substrate to form processing holes in the processing substrate, where a bottom surface of the processing substrate contacts the etching solution.

22 Claims, 12 Drawing Sheets

(56) References Cited

U.S. PATENT DOCUMENTS

| | | | |
|---|---|---|---|
| 5,745,617 A * | 4/1998 | Starodubov | G02B 6/02138 |
| | | | 359/566 |
| 5,935,294 A * | 8/1999 | Weekamp | H01L 24/11 |
| | | | 75/336 |
| 6,211,485 B1 * | 4/2001 | Burgess | B23K 26/389 |
| | | | 219/121.7 |
| 6,862,490 B1 * | 3/2005 | Duignan | H01L 21/67028 |
| | | | 700/121 |
| 7,255,806 B2 * | 8/2007 | Yoshimura | B23K 26/0665 |
| | | | 216/26 |
| 7,767,595 B2 * | 8/2010 | Tanaka | B23K 26/40 |
| | | | 257/E21.328 |
| 8,951,819 B2 * | 2/2015 | Lei | B23K 26/0661 |
| | | | 438/33 |
| 9,027,573 B2 * | 5/2015 | Hyakutake | H01L 21/67109 |
| | | | 134/105 |
| 10,077,206 B2 | 9/2018 | Castle et al. | |
| 10,698,280 B2 | 6/2020 | Fukasawa | |
| 2003/0201258 A1 * | 10/2003 | De Steur | B23K 26/066 |
| | | | 219/121.69 |
| 2004/0140296 A1 * | 7/2004 | Lis | H01M 4/92 |
| | | | 219/121.61 |
| 2004/0149705 A1 * | 8/2004 | Yamada | B81C 1/00103 |
| 2005/0252894 A1 * | 11/2005 | Imai | H01L 21/02691 |
| | | | 219/121.78 |
| 2008/0087629 A1 * | 4/2008 | Shimomura | H01L 29/66765 |
| | | | 257/E21.414 |
| 2008/0105303 A1 * | 5/2008 | Oswald | H01L 31/20 |
| | | | 257/E27.125 |
| 2009/0074987 A1 * | 3/2009 | Auyeung | C23C 14/28 |
| | | | 427/596 |
| 2012/0080088 A1 * | 4/2012 | Grabitz | H01L 31/022425 |
| | | | 257/E31.127 |
| 2013/0183833 A1 * | 7/2013 | Duan | B23K 26/0676 |
| | | | 219/121.73 |
| 2014/0367041 A1 * | 12/2014 | Lei | H01J 37/32899 |
| | | | 219/121.68 |
| 2015/0243559 A1 * | 8/2015 | Park | B23K 26/0624 |
| | | | 156/345.1 |
| 2015/0287638 A1 * | 10/2015 | Park | H01L 21/30655 |
| | | | 219/121.43 |
| 2015/0370374 A1 * | 12/2015 | Chan | H05K 1/0274 |
| | | | 219/121.68 |
| 2016/0086851 A1 * | 3/2016 | Park | H01L 21/78 |
| | | | 219/121.68 |

FOREIGN PATENT DOCUMENTS

| | | |
|---|---|---|
| JP | 10305374 A * | 11/1998 |
| JP | 2002-254184 | 9/2002 |
| JP | 2017-226581 | 12/2017 |
| JP | 2018-518445 | 7/2018 |
| KR | 100527247 B1 * | 11/2005 |
| KR | 10-1625948 | 5/2016 |
| KR | 10-2019-0049972 | 5/2019 |

OTHER PUBLICATIONS

Bohme et al. (Effects of halogenated organic solvents on laser-induced backside wet etching of fused silica, 2006) (Year: 2006).*

Zimmer et al. (Laser Induced Backside Wet Etching of Transparent Materials with Organic and Metallic Absorbers, 2008) (Year: 2008).*

Mishra et al. ("Laser Beam Micro Machining (LBMM)—A review", 2015) (Year: 2015).*

Bohme et al. (Backside etching of UV-transparent materials at the interface to liquids, 2002) (Year: 2002).*

Hiroyuki Niino et al., "Surface Micro-Fabrication of Silica Glass by Excimer Laser Irradiation of Organic Solvent", Journal of Photochemistry and Photobiology A: Chemistry, 2003, pp. 179-182, vol. 158.

Yoshizo Kawaguchi et al., "Etching a Micro-Trench with a Maximum Aspect Ratio of 60 on Silica Glass by Laser-Induced Backside Wet Etching (LIBWE)", Japanese Journal of Applied Physics, 2005, pp. L176-L178, vol. 44, No. 5.

* cited by examiner

SUBSTRATE PROCESSING APPARATUS AND METHOD

CROSS-REFERENCE TO RELATED APPLICATION(S)

This application claims priority to and benefits of Korean Patent Application No. 10-2019-0133213 under 35 U.S.C § 119 filed on Oct. 24, 2019, in the Korean Intellectual Property Office, the entire contents of which are hereby incorporated by reference.

BACKGROUND

1. Technical Field

The disclosure relates to a substrate processing apparatus and method having a high processing speed.

2. Background of the Related Art

Various methods may be used to form a hole in a substrate. For example, an ultrashort pulse laser may be employed to form the hole in the substrate. An ultrashort pulse laser can transfer concentrated energy, and because of the transfer of concentrated energy, the quality of processing of the hole may increase. However, production efficiency may decrease due to low processing speeds.

It is to be understood that this background of the technology section is, in part, intended to provide useful background for understanding the technology. However, this background of the technology section may also include ideas, concepts, or recognitions that were not part of what was known or appreciated by those skilled in the pertinent art prior to a corresponding effective filing date of the subject matter disclosed herein.

SUMMARY

Embodiments of the disclosure provide a substrate processing apparatus and method having a high processing speed.

According to an embodiment, a method of processing a substrate may include:

placing a mask on a top surface of a processing substrate, the mask including a plurality of openings; placing a cover substrate on the mask, the cover substrate overlapping the plurality of openings of the mask; placing the processing substrate on a vessel that accommodates an etching solution; and irradiating a beam onto the top surface of the processing substrate to form a plurality of processing holes in the processing substrate, wherein a bottom surface of the processing substrate contacts the etching solution.

In an embodiment, the etching solution may include an aromatic compound.

In an embodiment, the etching solution may include a halogen atom. The halogen atom may be a fluorine atom or a chlorine atom.

In an embodiment, the etching solution may include a metal oxide. The metal oxide may be cerium dioxide ($CeO_2$).

In an embodiment, the etching solution may include a compound including at least one of benzene, toluene, and naphthalene.

In an embodiment, the placing the mask may include placing the mask directly on the processing substrate.

In an embodiment, the method may include removing the mask after forming the plurality of processing holes.

In an embodiment, the placing the mask may include placing the mask in contact with or spaced apart from the top surface of the processing substrate.

In an embodiment, the method may include coupling the processing substrate to the vessel by a connecting member.

In an embodiment, the method may include: providing the vessel with the etching solution through a solution supply that may be connected with the vessel; and discharging the etching solution from the vessel through a solution exhaust that may be connected with the vessel.

In an embodiment, the method may include rotating a rotator installed in the vessel.

In an embodiment, the forming the plurality of processing holes may include forming the plurality of processing holes from the bottom surface of the processing substrate toward the top surface of the processing substrate.

In an embodiment, the beam may be a pulse laser. The pulse laser may be an excimer laser, a solid laser, a semiconductor laser, or an X-ray laser.

In an embodiment, the beam may be a cyclotron radiation.

In an embodiment, the cover substrate may include a material through which the beam may pass. The mask may include a blocking material that may block the beam. The blocking material may include chromium.

In an embodiment, the method may include controlling a temperature of the etching solution.

According to an embodiment, a substrate processing apparatus may include: a vessel that may accommodate an etching solution; a beam radiator disposed on the vessel; a mask disposed between the vessel and the beam radiator, the mask including a plurality of openings; and a cover substrate disposed on the mask, the cover substrate overlapping the plurality of openings.

In an embodiment, the etching solution may include an aromatic compound, and may include a halogen atom and a metal oxide.

In an embodiment, the apparatus may include a rotator disposed in the vessel.

In an embodiment, the apparatus may include: a solution supply that may be connected with the vessel and provide the vessel with the etching solution; and a solution exhaust that may be connected with the vessel and discharge the etching solution from the vessel.

In an embodiment, a beam emitted from the beam radiator may be a pulse laser or a cyclotron radiation. The pulse laser may be an excimer laser, a solid laser, a semiconductor laser, or an X-ray laser.

In an embodiment, the apparatus may include: an adiabatic part disposed around the vessel; and a temperature controller that may control a temperature of the etching solution.

BRIEF DESCRIPTION OF THE DRAWINGS

The accompanying drawings are included to provide a further understanding, and are incorporated in and constitute a part of this specification. The drawings illustrate embodiments and, together with the description, serve to explain principles of the disclosure. In the drawings.

DETAILED DESCRIPTION OF THE EMBODIMENTS

Figure 1:
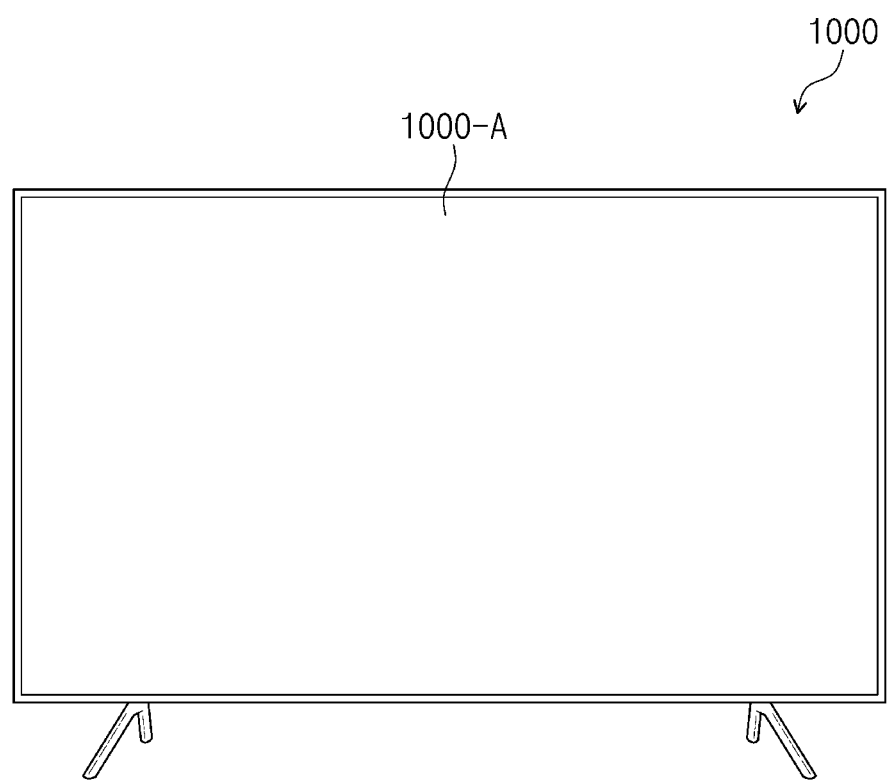
FIG. 1 illustrates a plan view showing a display device according to an embodiment.
Figure 1:
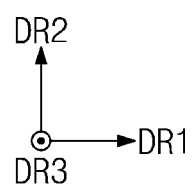

The disclosure will now be described more fully hereinafter with reference to the accompanying drawings, in which embodiments are shown. This disclosure may, however, be embodied in different forms and should not be construed as limited to the embodiments set forth herein. Rather, these embodiments are provided so that this disclosure will be thorough and complete, and will fully convey the scope of the disclosure to those skilled in the art.

Some of the parts which are not associated with the description may not be provided in order to describe embodiments of the disclosure and like reference numerals refer to like elements throughout the specification.

When a layer, film, region, substrate, or area, is referred to as being "on", "connected to" or "coupled to" another layer, film, region, substrate, or area, it may be directly on, connected to or coupled to the other film, region, substrate, or area, or intervening films, regions, substrates, or areas, may be present therebetween. Conversely, when a layer, film, region, substrate, or area, is referred to as being "directly on" connected to or coupled to another layer, film, region, substrate, or area, intervening layers, films, regions, substrates, or areas, may be absent therebetween. Further when a layer, film, region, substrate, or area, is referred to as being "below" another layer, film, region, substrate, or area, it may be directly below the other layer, film, region, substrate, or area, or intervening layers, films, regions, substrates, or areas, may be present therebetween. Conversely, when a layer, film, region, substrate, or area, is referred to as being "directly below" another layer, film, region, substrate, or area, intervening layers, films, regions, substrates, or areas, may be absent therebetween. Further, "over" or "on" may include positioning on or below an object and does not necessarily imply a direction based upon gravity.

It will be further understood that when the terms "comprises," "comprising," "includes" and/or "including" are used in this specification, they or it may specify the presence of stated features, integers, steps, operations, elements and/ or components, but do not preclude the presence or addition of other features, integers, steps, operations, elements, components, and/or any combination thereof.

The spatially relative terms "below", "beneath", "lower", "above", "upper", or the like, may be used herein for ease of description to describe the relations between one element or component and another element or component as illustrated in the drawings. It will be understood that the spatially relative terms are intended to encompass different orientations of the device in use or operation, in addition to the orientation depicted in the drawings. For example, in the case where a device illustrated in the drawing is turned over, the device positioned "below" or "beneath" another device may be placed "above" another device. Accordingly, the illustrative term "below" may include both the lower and upper positions. The device may also be oriented in other directions and thus the spatially relative terms may be interpreted differently depending on the orientations.

Further, in the specification, the phrase "in a plan view" means when an object portion is viewed from above, and the phrase "in a schematic cross-sectional view" means when a schematic cross-section taken by vertically cutting an object portion is viewed from the side.

Additionally, the terms "overlap" or "overlapped" mean that a first object may be above or below or to a side of a second object, and vice versa. Additionally, the term "overlap" may include layer, stack, face or facing, extending over, covering or partly covering or any other suitable term as would be appreciated and understood by those of ordinary skill in the art. The terms "face" and "facing" mean that a first element may directly or indirectly oppose a second element. In a case in which a third element intervenes between the first and second element, the first and second element may be understood as being indirectly opposed to one another, although still facing each other. When an element is described as 'not overlapping' or 'to not overlap' another element, this may include that the elements are spaced apart from each other, offset from each other, or set aside from each other or any other suitable term as would be appreciated and understood by those of ordinary skill in the art.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations, or within ±30%, 20%, 10%, 5% of the stated value.

In the specification and the claims, the term "and/or" is intended to include any combination of the terms "and" and "or" for the purpose of its meaning and interpretation. For example, "A and/or B" may be understood to mean "A, B, or A and B." The terms "and" and "or" may be used in the conjunctive or disjunctive sense and may be understood to be equivalent to "and/or." In the specification and the claims, the phrase "at least one of" is intended to include the meaning of "at least one selected from the group of" for the purpose of its meaning and interpretation. For example, "at least one of A and B" may be understood to mean "A, B, or A and B."

In the drawings, sizes and thicknesses of elements may be enlarged for better understanding, clarity, and ease of description thereof. However, the disclosure is not limited to the illustrated sizes and thicknesses. In the drawings, the thicknesses of layers, films, panels, regions, and other elements, may be exaggerated for clarity. In the drawings, for better understanding and ease of description, the thicknesses of some layers and areas may be exaggerated.

It will be understood that, although the terms first, second, etc. may be used herein to describe various components, these components should not be limited by these terms. These terms are only used to distinguish one component from another component. For example, a first component could be termed a second component, and vice versa without departing from the scope of the disclosure. Unless the context clearly indicates otherwise, the singular forms are intended to include the plural forms as well.

Unless otherwise defined, all terms used herein including technical and scientific terms have the same meaning generally understood by one of ordinary skill in the art. Terms as defined in dictionaries generally used should be understood as having a meaning identical or meaning contextually defined in the art and should not be understood as having an ideally or excessively formal meaning unless defined herein.

The following will now describe embodiments of the disclosure in conjunction with the accompanying drawings.

FIG. 1 illustrates a plan view showing a display device according to an embodiment.

Referring to FIG. 1, a display device 1000 may be an apparatus that activates in response to an electrical signal. The display device 1000 may include various apparatuses. For example, the display device 1000 may be applicable to large-sized electronic apparatuses, such as televisions, monitors, or indoor/outdoor billboards, and also may be applicable to small- and medium-sized electronic apparatuses, such as personal computers, laptop computers, personal digital terminals, navigation units, game consoles, portable electronic devices, and cameras. However, these apparatuses are merely examples, and the display device 1000 may also be applicable to other electronic devices or apparatuses consistent with, or within, the scope and spirit of the disclosure.

The display device 1000 may have a display surface 1000-A on which an image or images may be displayed in a third direction DR3, and the display surface 1000-A may be parallel both to a first direction DR1 and to a second direction DR2. The image may include not only a dynamic image but a static image.

A bezel of the display device 1000 may be defined as a region between an edge of the display surface 1000-A and an outermost edge of the display device 1000. When the bezel has a reduced width, the display surface 1000-A may have an increased proportion on a surface of the display device 1000.

Figure 2:
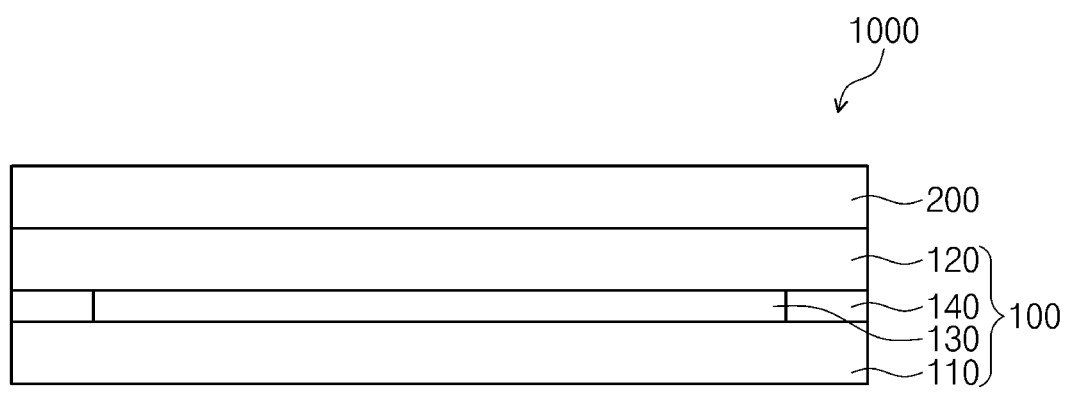
FIG. 2 illustrates a simplified schematic cross-sectional view showing a display device according to an embodiment.
Figure 2:
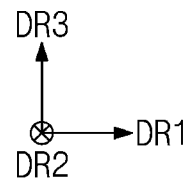

FIG. 2 illustrates a simplified schematic cross-sectional view showing a display device according to an embodiment.

Referring to FIG. 2, the display device 1000 may include a display panel 100 and an input sensing layer 200.

The display panel 100 may display an image or images. The display panel 100 may be a light-receiving type display panel or a self-luminous type display panel.

For example, the display panel may be a liquid crystal display panel. The liquid crystal display panel may be provided with light from a backlight unit. The liquid crystal display panel may include a liquid crystal layer, and the orientation of liquid crystals in the liquid crystal layer may be adjusted by the application of an electric field to control the transmission of the light.

As another example, the display panel 100 may be an organic light emitting display panel, a quantum-dot light emitting display panel, a micro-LED display panel, or a nano-LED display panel. A light emission layer of the organic light emitting display panel may include an organic light emitting material. A light emission layer of the quantum-dot light emitting display panel may include a quantum-dot or a quantum-rod. A light emission layer of the micro-LED display panel may include a micro-sized LED. A light emission layer of the nano-LED display panel may include a nano-sized LED.

The input sensing layer 200 may obtain coordinate information of an external input (for example, a touch event). The input sensing layer 200 may detect the external input in a mutual capacitance manner or a self-capacitance manner. Alternatively, the input sensing layer 200 may detect the external input in a mutual capacitance manner or a self-capacitance manner. In an embodiment, the display device 1000 may not include the input sensing layer 200.

Figure 3:
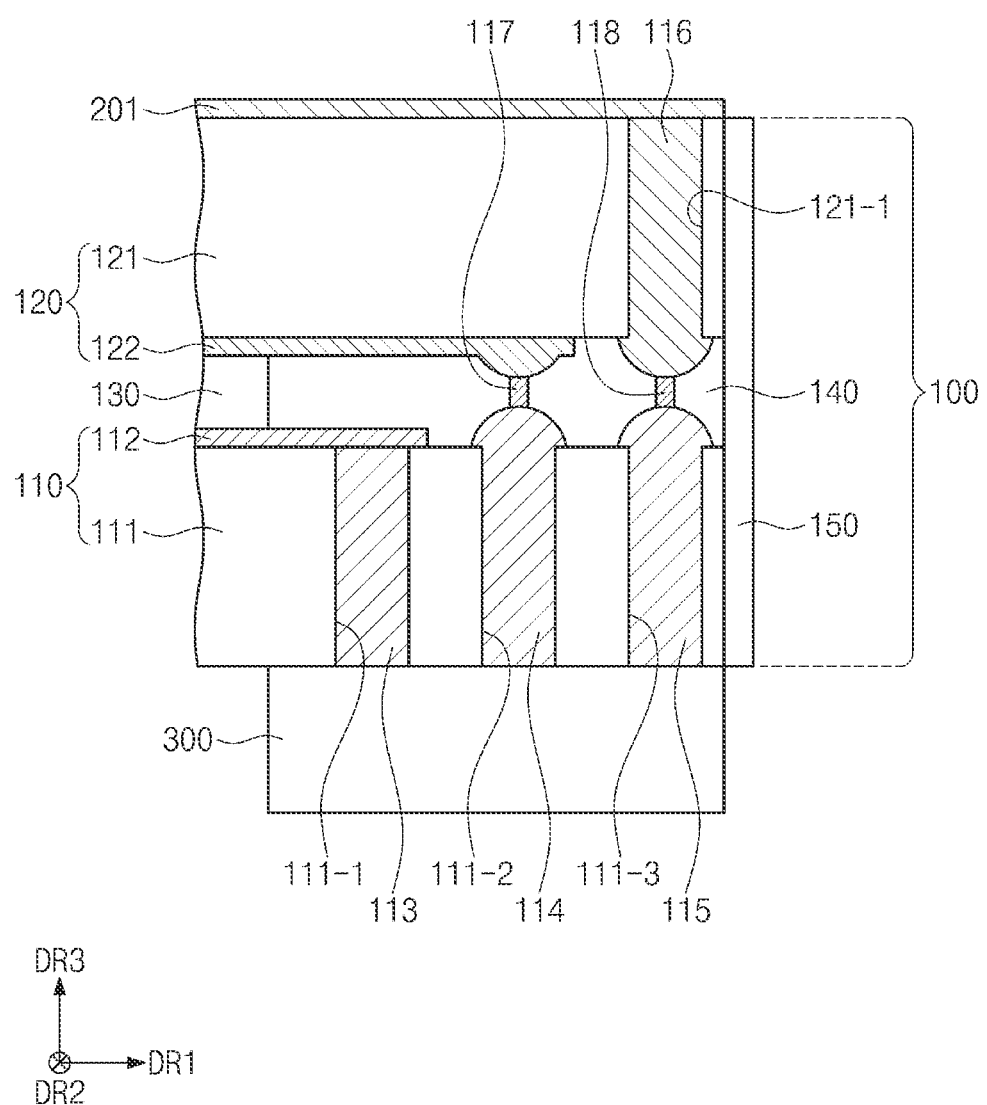
FIG. 3 illustrates an enlarged schematic cross-sectional view partially showing a display device according to an embodiment.

FIG. 3 illustrates an enlarged schematic cross-sectional view showing a display device according to an embodiment.

Referring to FIG. 3, the display panel 100 may include a first substrate 110, a second substrate 120, an image implementing layer 130, and a connecting member 140. The connecting member 140 may also be referred to as a coupling member, connector, connecting unit, seal, or sealant.

The image implementing layer 130 may be disposed between the first substrate 110 and the second substrate 120. The image implementing layer 130 may be a layer to generate light or a layer to control the transmittance of light provided externally. For example, the image implementing layer 130 may be a transmittance control layer that may include liquid crystal molecules. Alternatively, the image implementing layer 130 may be a light emission layer that may include one or more of a light emitting material, a quantum-dot, a quantum rod, a micro-sized LED, and a nano-sized LED.

The connecting member 140 may be disposed between the first substrate 110 and the second substrate 120. The connecting member 140 may be coupled to, or connected to, the first substrate 110 and the second substrate 120.

The connecting member 140 may be any type of connector that couples the first substrate 110 and the second substrate 120 together. For example, the connector may take the form of the material of the connecting member 140 such as an organic material such as a photo-curable resin or a photo-plastic resin, or an inorganic material such as a frit seal, but is not limited to any one particular embodiment.

The first substrate 110 may include a first base substrate 111 and a first wiring layer 112. The second substrate 120 may include a second base substrate 121 and a second wiring layer 122. A sensing wiring layer 201 of the input sensing layer (see 200 of FIG. 2) may be disposed on the second substrate 120. In an embodiment, one or more of the second wiring layer 122 and the sensing wiring layer 201 may be omitted.

In an embodiment, the first wiring layer 112 may include data lines or gate lines included in the display panel 100, the second wiring layer 122 may include a common line electrically connected to a common electrode, and the sensing wiring layer 201 may include sensing lines electrically connected to an sensing electrode.

A driving part 300 may be attached to or disposed on a bottom surface of the display panel 100. The driving part 300 may include a driver chip, a circuit board, or a circuit film. The driving part 300 may include a signal controller, for example, a timing controller. The driving part 300 may control an operation of the display panel 100 and an operation of the input sensing layer (see 200 of FIG. 2).

The first base substrate 111 may include holes 111-1, 111-2, and 111-3, and likewise the second base substrate 121 may include holes 121-1. A conductive material may be provided in each of the holes 111-1, 111-2, 111-3, and 121-1.

First conductors 113 may be disposed in corresponding first holes 111-1, second conductors 114 may be disposed in corresponding second holes 111-2, and third conductors 115 may be disposed in corresponding third holes 111-3. Fourth conductors 116 may be disposed in corresponding holes 121-1 of the second base substrate 121.

Connection lines (not illustrated) of the first wiring layer 112 may be electrically connected through the first conductors 113 to the driving part 300.

The second wiring layer 122 and the sensing wiring layer 201 may be spaced apart from the first substrate 110. Therefore, the first substrate 110 and the second substrate 120 may have therebetween first additional lines 117 that may electrically connect the second wiring layer 122 to the second conductors 114, and may also have therebetween second additional lines 118 that may electrically connect the sensing wiring layer 201 to the third conductors 115. The first and second additional lines 117 and 118 may penetrate the connecting member 140.

Connection lines (not illustrated) of the second wiring layer 122 may be electrically connected to the driving part 300 through the first additional lines 117 and the second conductors 114. Connection lines (not illustrated) of the sensing wiring layer 201 may be electrically connected to the driving part 300 through the fourth conductors 116, the second additional lines 118, and the third conductors 115.

The first and second base substrates 111 and 121 may be subjected to a process for processing the holes 111-1, 111-2, 111-3, and 121-1. For example, the number of holes may be as many as the number of signal lines. In this case, several tens, hundreds, or thousands of holes may be formed in each of the first and second base substrates 111 and 121. Accordingly, a processing speed for forming a large number of holes in the first and second base substrates 111 and 121 may greatly affect production efficiency of the display device (for example, the display device as illustrated as reference element 1000 of FIG. 2).

A lateral sealing member 150 may be provided or disposed on a lateral surface of the display panel 100. The lateral sealing member 150 may include the same or similar material as that of the connecting member 140, but the disclosure is not limited thereto. Alternatively, in an embodiment, the lateral sealing member 150 may be omitted. It is to be understood that the lateral sealing member 150 may be other than lateral within the spirit and the scope of the disclosure.

Figure 4:
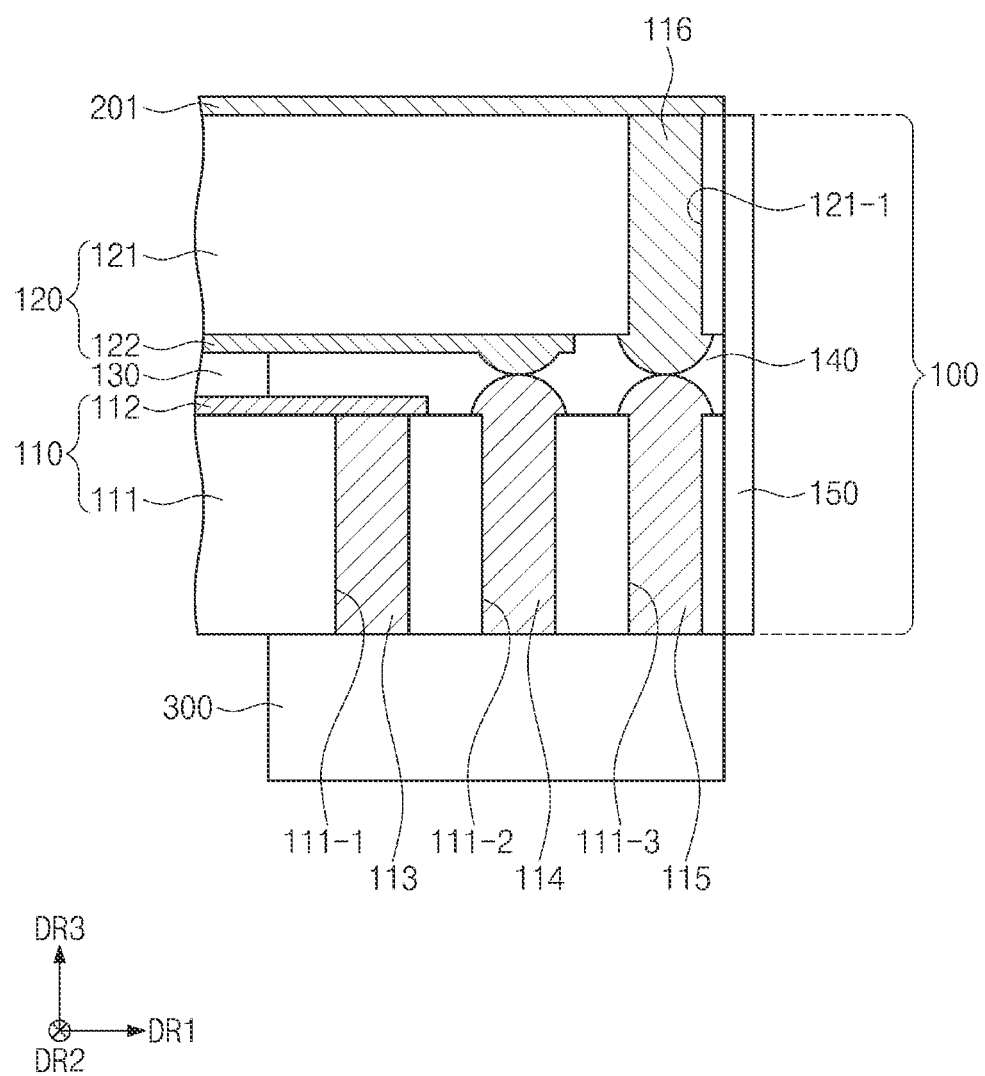
FIG. 4 illustrates an enlarged schematic cross-sectional view partially showing a display device according to an embodiment.

FIG. 4 illustrates an enlarged schematic cross-sectional view showing a display device according to an embodiment. In an embodiment shown in FIG. 4, the same components as those of the embodiment illustrated in FIG. 3 are allocated the same reference numerals thereto without explanation thereof, and differences will be mainly described.

Referring to FIG. 4, a portion of the second wiring layer 122 may have a substantially protruding shape or a protrusion, and each of the second, third, and fourth conductors 114, 115, and 116 may also have a substantially protruding shape. The second wiring layer 122 may directly contact the second conductors 114. The third conductors 115 may directly contact the fourth conductors 116.

Figure 5:
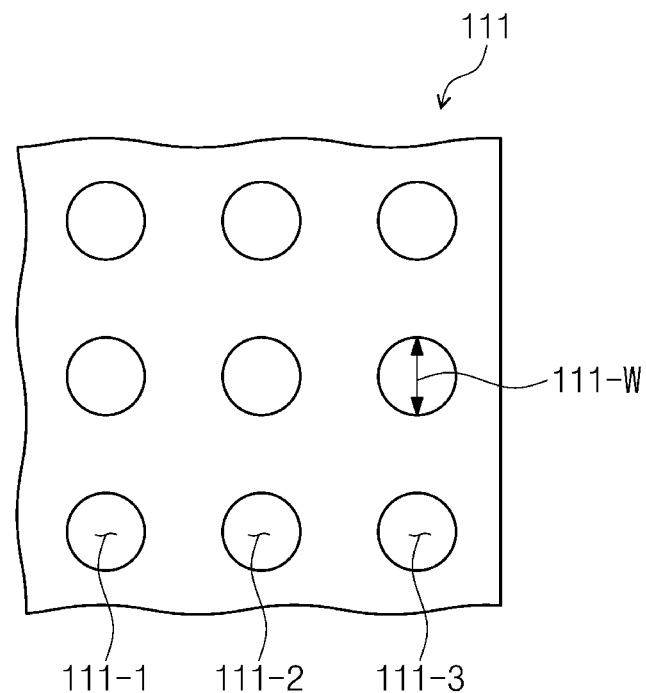
FIG. 5 illustrates an enlarged plan view showing a substrate according an embodiment.

FIG. 5 illustrates an enlarged plan view showing a substrate according to an embodiment.

Referring to FIGS. 3 and 5, the first base substrate 111 may be a glass substrate. Holes 111-1, 111-2, and 111-3 may be provided or disposed in the first base substrate 111. Portions of the first base substrate 111 may be removed to form the holes 111-1, 111-2, and 111-3.

Each of the holes 111-1, 111-2, and 111-3 may have a width 111-W in a range of about 10 micrometers to about 100 micrometers. A process may be performed to form the holes 111-1, 111-2, and 111-3 in the first base substrate 111, and this will be further discussed in detail below.

Figure 6:
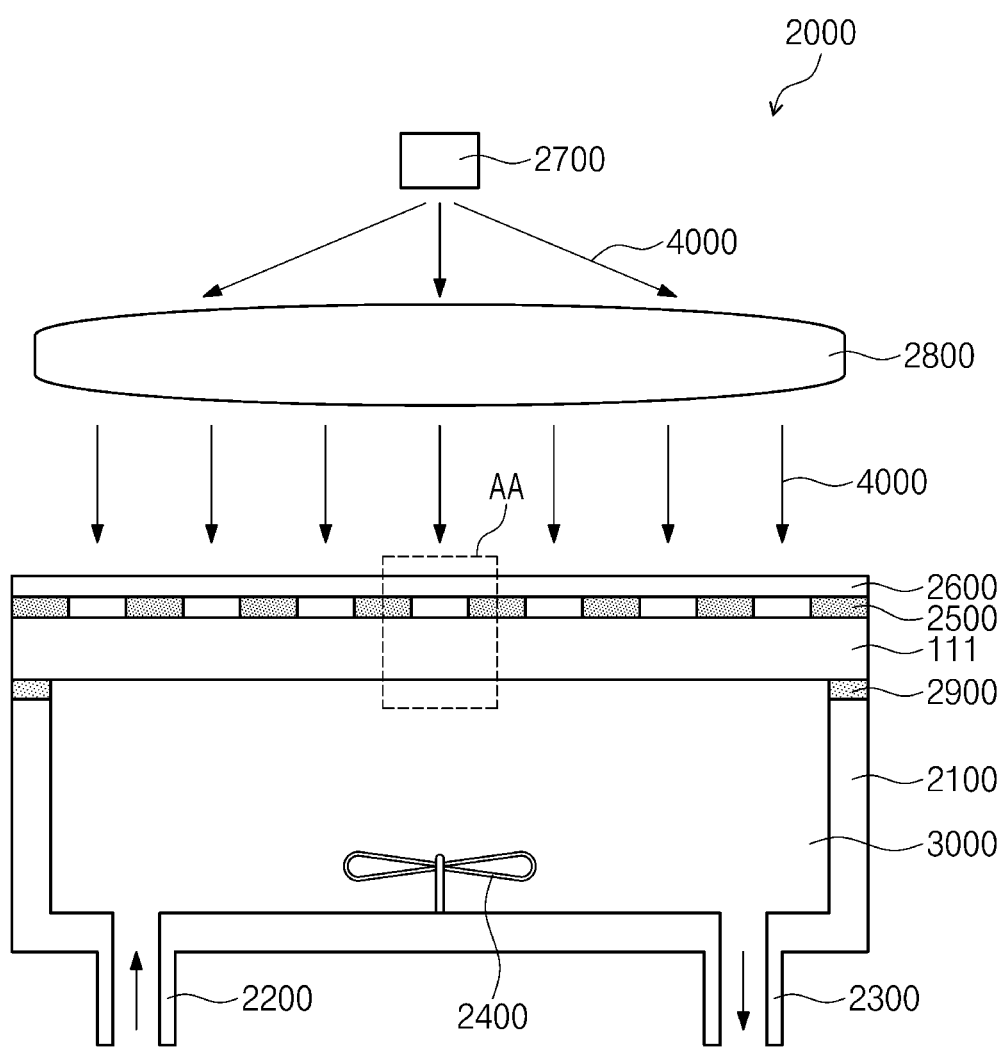
FIG. 6 illustrates a schematic diagram showing a substrate processing apparatus according to an embodiment.

FIG. 6 illustrates a schematic diagram showing a substrate processing apparatus according to an embodiment.

Referring to FIG. 6, a substrate processing apparatus 2000 may include a vessel 2100, a solution supply 2200, a solution exhaust 2300, a rotator 2400, a cover substrate 2600, a beam radiator 2700, and a lens part 2800.

The vessel 2100 may accommodate an etching solution 3000. The vessel 2100 may refer to an accommodation part. The vessel 2100 may be connected with the solution supply 2200 and the solution exhaust 2300. For example, the solution supply 2200 may provide the vessel 2100 with the etching solution 3000, and the solution exhaust 2300 may externally exhaust the etching solution 3000 from the vessel 2100. Substances that may be produced during processing may also be discharged through the solution exhaust 2300. In an embodiment, the substrate processing apparatus 2000 may include neither the solution supply 2200 nor the solution exhaust 2300.

The rotator 2400 may be installed or disposed in the vessel 2100. The rotator 2400 may rotate to stir the etching solution 3000 in the vessel 2100. For example, the rotator 2400 may circulate the etching solution 3000, and thus an etching may be continuously performed without interruption.

The beam radiator 2700 may be placed or disposed over the vessel 2100. The beam radiator 2700 may irradiate a beam 4000.

In an embodiment, the beam 4000 may be a pulse laser. The pulse laser may be an excimer laser, a solid laser, a semiconductor laser, or an X-ray laser. The excimer laser may be a laser of KrF, XeCl, $CO_2$, or XeF. The solid laser may be a glass laser or a YAG laser. Alternatively, the beam 4000 may be a cyclotron radiation.

The lens part 2800 may be disposed between the beam radiator 2700 and the vessel 2100. The lens part 2800 may be control a path of the beam 4000 provided or emitted from the beam radiator 2700. For example, the lens part 2800 may have a substantially convex lens shape, and may change a propagation direction of the beam 4000 such that the beam 4000 or beams output from the lens part 2800 may travel substantially in parallel. In an embodiment, the lens part 2800 may be omitted.

The vessel 2100 may be provided thereon with the first base substrate 111 (referred to hereinafter as a processing substrate). A connecting member 2900 may be disposed between the processing substrate 111 and the vessel 2100. The connecting member 2900 may couple the processing substrate 111 to the vessel 2100. A bottom surface of the processing substrate 111 may contact the etching solution 3000.

A mask 2500 may be disposed on the processing substrate 111, and the mask 2500 may have openings. The openings may have their shapes that may substantially correspond to shapes of holes to be formed in the processing substrate 111.

The mask 2500 may include a material that may block or absorb the beam 4000. For example, the mask 2500 may include chromium. In an embodiment, the mask 2500 may be directly formed on the processing substrate 111.

The cover substrate 2600 may be disposed on the mask 2500. The cover substrate 2600 may include a material through which the beam 4000 may pass. For example, the cover substrate 2600 may be a silica glass substrate. The cover substrate 2600 may have a thickness less than that of the processing substrate 111.

The etching solution 3000 may include a material that absorbs the beam 4000. For example, the etching solution 3000 may include an aromatic compound. The etching solution 3000 may include a compound that includes at least one benzene ring, and for example, the compound may include benzene, toluene, or naphthalene.

In an embodiment, the etching solution 3000 may include an aromatic compound and an abrasive. The abrasive may be a metal oxide abrasive, for example, cerium dioxide ($CeO_2$). The abrasive may have a granular diameter of equal to or less than about 1 micrometer, but the disclosure is not limited thereto. When an abrasive is added to the etching solution 3000, an etching rate may increase.

In an embodiment, the etching solution 3000 may include an aromatic compound and a halogen atom (or at least one kind of halogen atom). When a halogen atom is added to the etching solution 3000, an etching rate may increase. The halogen atom may be a fluorine atom or a chlorine atom.

In an embodiment, the etching solution 3000 may include an aromatic compound, an abrasive, and a halogen atom (or at least one kind of halogen atom).

FIGS. 7A to 7F illustrate schematic cross-sectional views showing a substrate processing method according to an embodiment.

Figure 7A:
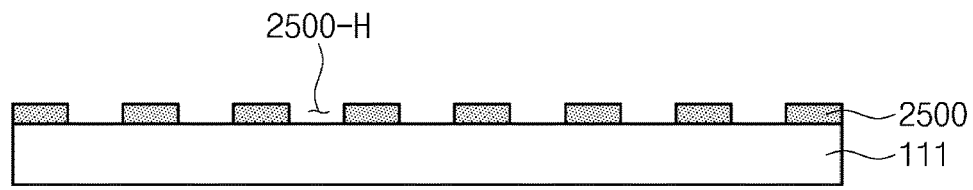
FIGS. 7A to 7F illustrate schematic cross-sectional views showing a substrate processing method according to an embodiment.

Referring to FIG. 7A, the mask 2500 may be formed or disposed on the processing substrate 111. The mask 2500 may be directly formed or disposed on the processing substrate 111. The mask 2500 may have openings 2500-H. The beam (see 4000 of FIG. 6) may pass through regions of the processing substrate 111 that are exposed to the openings 2500-H.

Figure 7B:
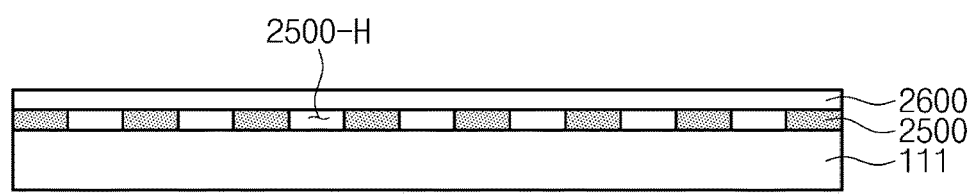

Referring to FIG. 7B, the cover substrate 2600 may be attached or disposed onto the mask 2500. The cover substrate 2600 may allow the beam (see 4000 of FIG. 6) to pass therethrough. The cover substrate 2600 may cover or overlap all of the openings 2500-H of the mask 2500.

In an embodiment, the cover substrate 2600 may directly contact a top surface of the mask 2500. Therefore, even when the etching solution (see 3000 of FIG. 6) passes through the openings 2500-H during a substrate processing process, it may be possible to prevent the etching solution 3000 from overflowing onto the top surface of the mask 2500.

Figure 7C:
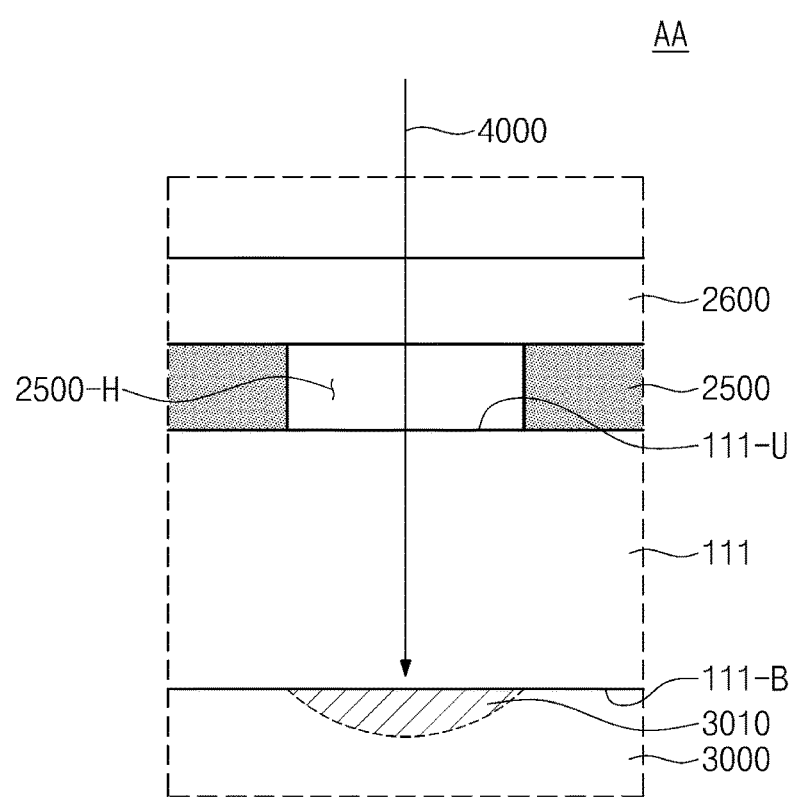

FIG. 7C shows an enlarged section AA of FIG. 6. Referring to FIG. 7C, the beam 4000 may pass through a region of the processing substrate 111, which region may not be covered with or overlapped by the mask 2500.

The etching solution 3000 may absorb the beam 4000. FIG. 7C depicts, as an example, that the etching solution 3000 may have a light-absorbing region 3010 into which the beam 4000 may be absorbed. The light-absorbing region 3010 is illustrated for convenience of description, and differently from that shown in FIG. 7C, a distinct boundary may not be made between the light-absorbing region 3010 and a non-light-absorbing region.

The light-absorbing region 3010 may substantially correspond to the opening 2500-H of the mask 2500, and may be adjacent to a bottom surface 111-B of the processing substrate 111. The etching solution 3000 of the light-absorbing region 3010 may be heated, and evaporation may occur from the etching solution 3000 into which thermal energy may be introduced, with the result that bubbles and shock waves may be generated in the light-absorbing region 3010. The impact waves may partially remove the bottom surface 111-B of the processing substrate 111.

Figure 7D:
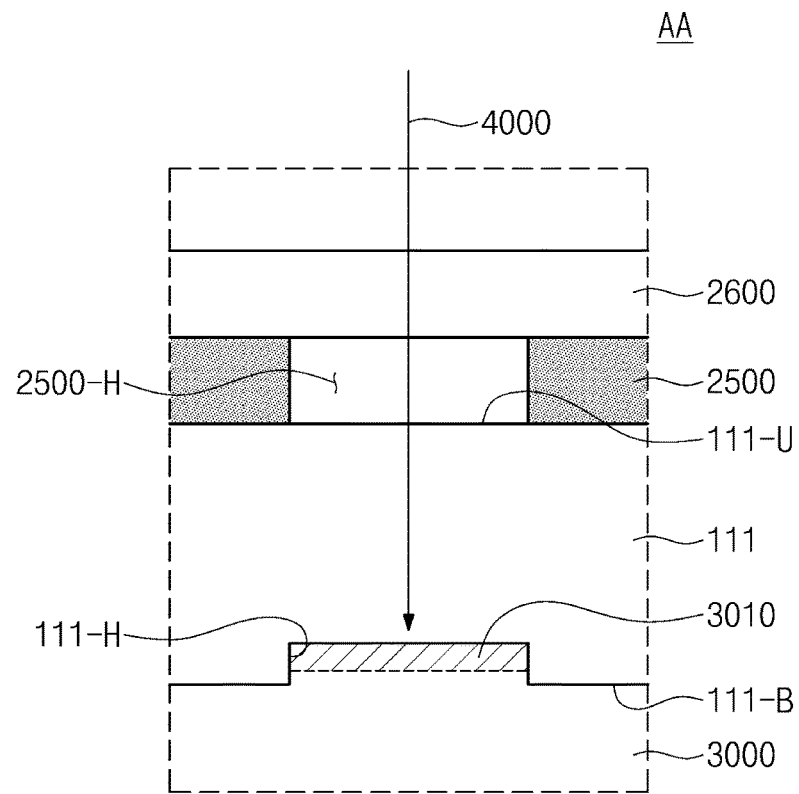

Referring to FIG. 7D, a hole may be formed in a direction from the bottom surface 111-B of the processing substrate 111 toward a top surface 111-U of the processing substrate 111. The irradiation of the beam 4000 may heat the etching solution 3000 of the light-absorbing region 3010. The light-absorbing region 3010 may be defined in a hole 111-H of the processing substrate 111.

According to an embodiment, the beam 4000 may be irradiated at a time interval. For example, on/off of the beam 4000 may be repeated at a period of about 100 msec. A temperature of the light-absorbing region 3010 may decrease while the beam 4000 is not irradiated, and at this time, the bubbles may disappear. The creation and annihilation of bubbles may be repeatedly performed to circulate the etching solution 3000 within the hole 111-H. The etching solution 3000 that has reacted may be externally discharged through the hole 111-H, and new etching solution 3000 may be introduced into the hole 111-H. Therefore, an etching process may be continuously performed without interruption.

According to an embodiment, the mask 2500 may cover or overlap all regions in which the formation of holes may not be required. The beam 4000 may be simultaneously irradiated onto regions of the processing substrate 111 that may not be covered with or overlapped by the mask 2500, and accordingly holes may be concurrently formed in the processing substrate 111.

According to an embodiment, the cover substrate 2600 may cover or overlap the openings 2500-H of the mask 2500. Thus, even when a path along which the etching solution 3000 may flow may be formed from the bottom surface 111-B to the top surface 111-U of the processing substrate 111, the etching solution 3000 may be prevented from overflowing onto an upper portion of the mask 2500.

Figure 7E:
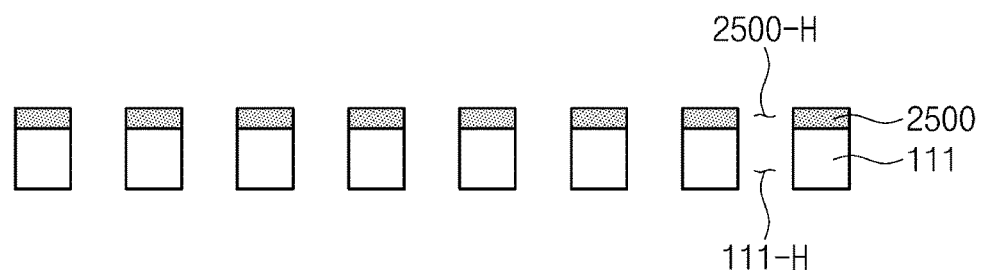

Referring to FIG. 7E, holes 111-H may be formed in the processing substrate 111. After the formation of the holes 111-H, the mask 2500 may be removed from the processing substrate 111. According to an embodiment, the processing substrate 111 may have portions where the holes 111-H will be formed, and the mask 2500 may not cover or overlap the portions of the processing substrate 111. The holes 111-H may thus be processed at the same time, and therefore a processing speed may increase. The mask 2500 may correlate to specific processing regions of the processing substrate 111.

As an example, because the mask 2500 specifies or identifies processing regions, the beam (see 4000 of FIG. 7D) may be relatively free in selection of size and wavelength.

Figure 7F:
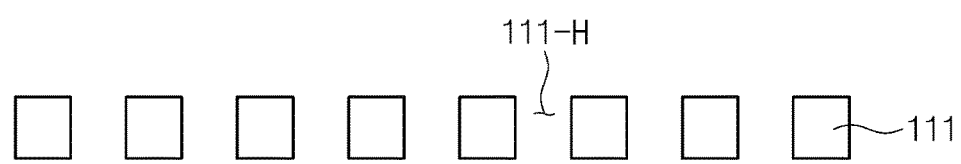

Referring to FIG. 7F, the holes 111-H of the processing substrate 111 may substantially correspond to the holes 111-1, 111-2, and 111-3 illustrated in FIG. 5.

Figure 8:
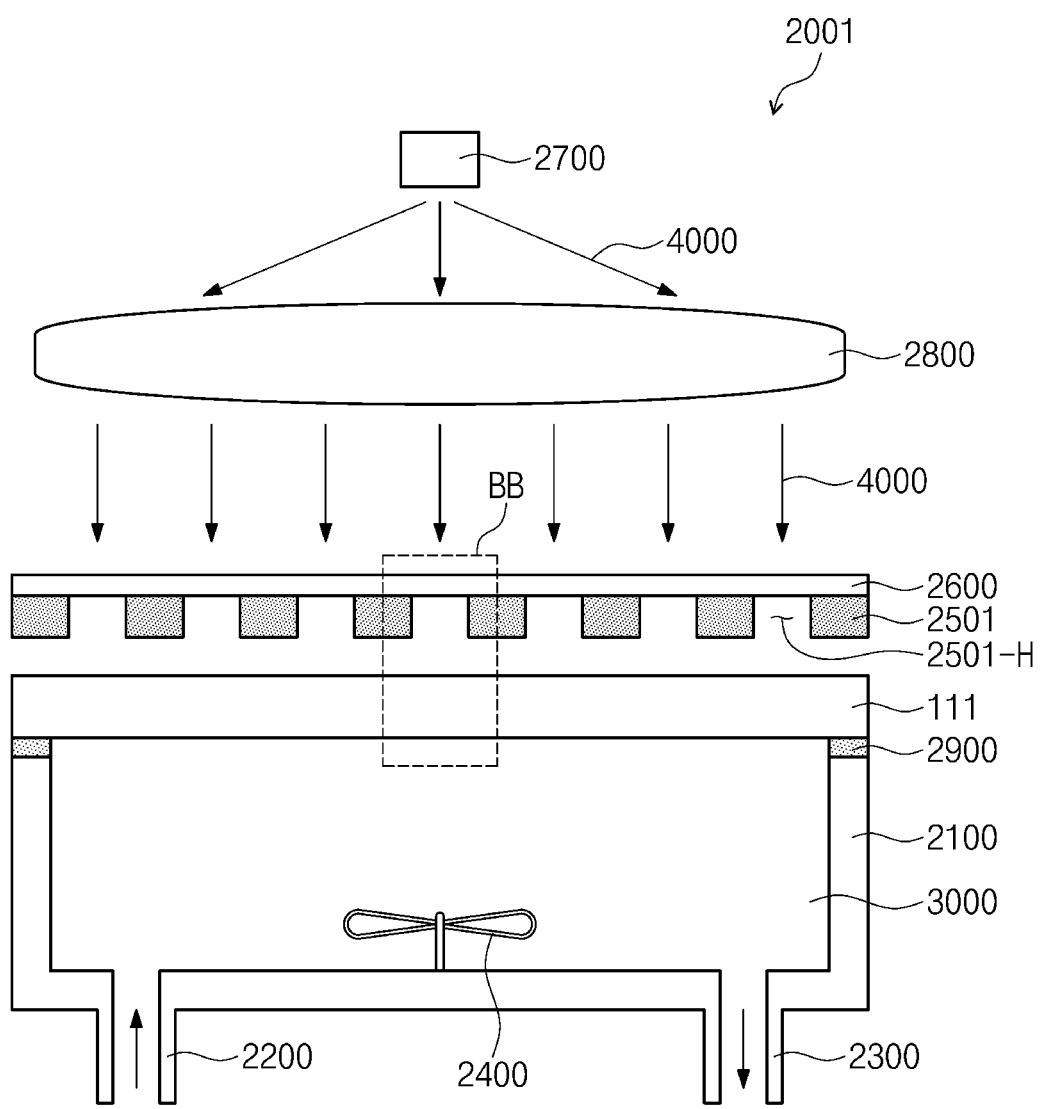
FIG. 8 illustrates a schematic diagram showing a substrate processing apparatus according to an embodiment.

FIG. 8 illustrates a schematic diagram showing a substrate processing apparatus according to an embodiment. In an embodiment shown in FIG. 8, the same components as those of the embodiment illustrated in FIG. 6 are allocated the same reference numerals thereto, and explanation thereof will be omitted.

A substrate processing apparatus 2001 may include the vessel 2100, the solution supply 2200, the solution exhaust 2300, the rotator 2400, a mask 2501, the cover substrate 2600, the beam radiator 2700, and the lens part 2800.

The mask 2501 may be disposed on the processing substrate 111, and may include openings 2501-H. The openings 2501-H may have their shapes that may substantially correspond to those of holes to be formed in the processing substrate 111.

The cover substrate 2600 may be disposed on the mask 2501. The cover substrate 2600 may include a material through which the beam 4000 passes. For example, the cover substrate 2600 may be a silica glass substrate. The cover substrate 2600 may have a thickness less than that of the processing substrate 111.

In an embodiment, the mask 2501 may be a component that may be separated from the processing substrate 111. Therefore, the mask 2501 may be reused in a process for processing the processing substrate 111.

Figure 9A:
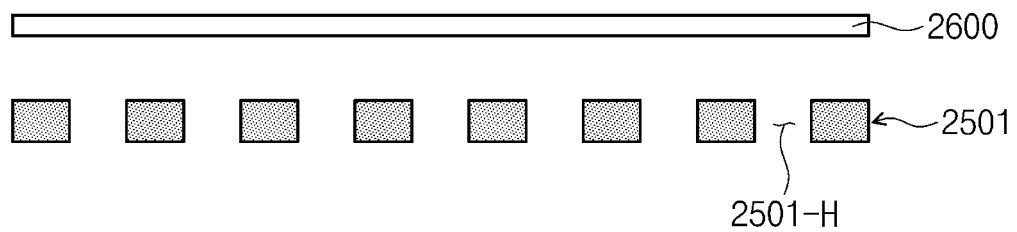
FIGS. 9A and 9B illustrate schematic cross-sectional views showing a substrate processing method according to an embodiment.
Figure 9B:
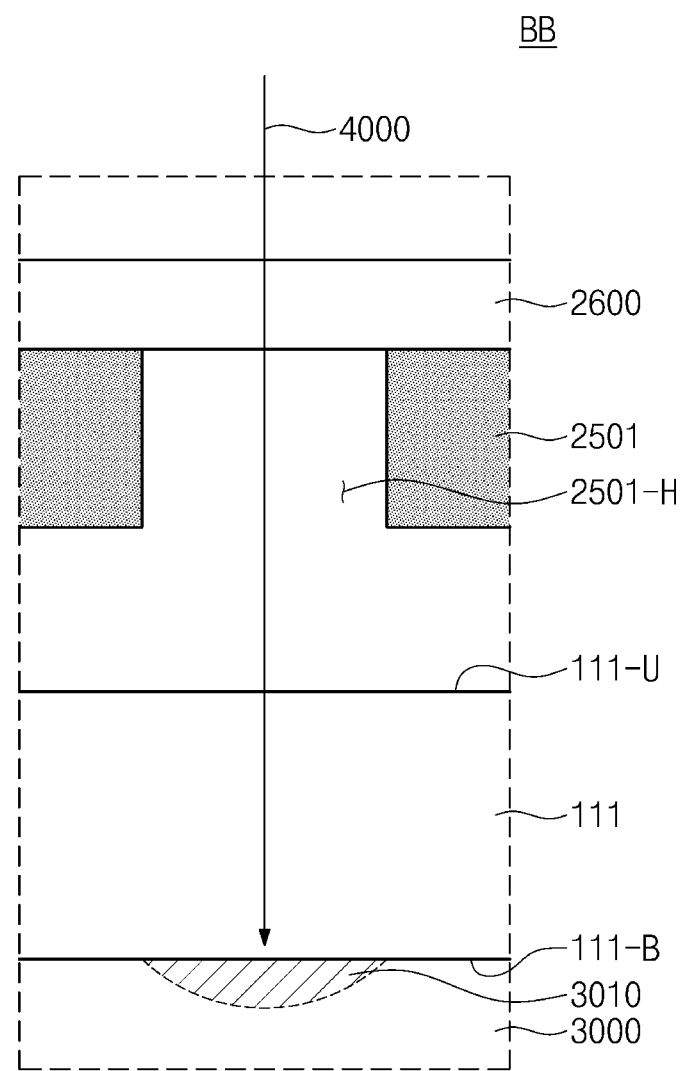

FIGS. 9A and 9B illustrate schematic cross-sectional views showing a substrate processing method according to an embodiment.

Referring to FIG. 9A, the mask 2501 and the cover substrate 2600 may be prepared. For example, the mask 2501 may be directly formed or disposed on the cover substrate 2600. Alternatively, the mask 2501 may be combined with the cover substrate 2600 through an adhesive layer. As an alternative, in contrast, the mask 2501 and the cover substrate 2600 may be in contact only with each other, not coupled or connected to each other by an intervening element or material therebetween.

FIG. 9B illustrates a schematic cross-sectional view showing section BB of FIG. 8. Referring to FIG. 9B, the mask 2501 may be spaced apart from the processing substrate 111. Therefore, the mask 2501 may not contact the top surface 111-U of the processing substrate 111.

The beam 4000 may be irradiated in a state where the mask 2501 and the processing substrate 111 may be spaced apart from each other. The beam 4000 may heat the etching solution 3000 of the light-absorbing region 3010, and evaporation may occur from the etching solution 3000 into which thermal energy may be introduced, resulting in bubbles or impact waves being generated in the light-absorbing region 3010. The impact waves may remove a portion of the bottom surface 111-B of the processing substrate 111.

Figure 10:
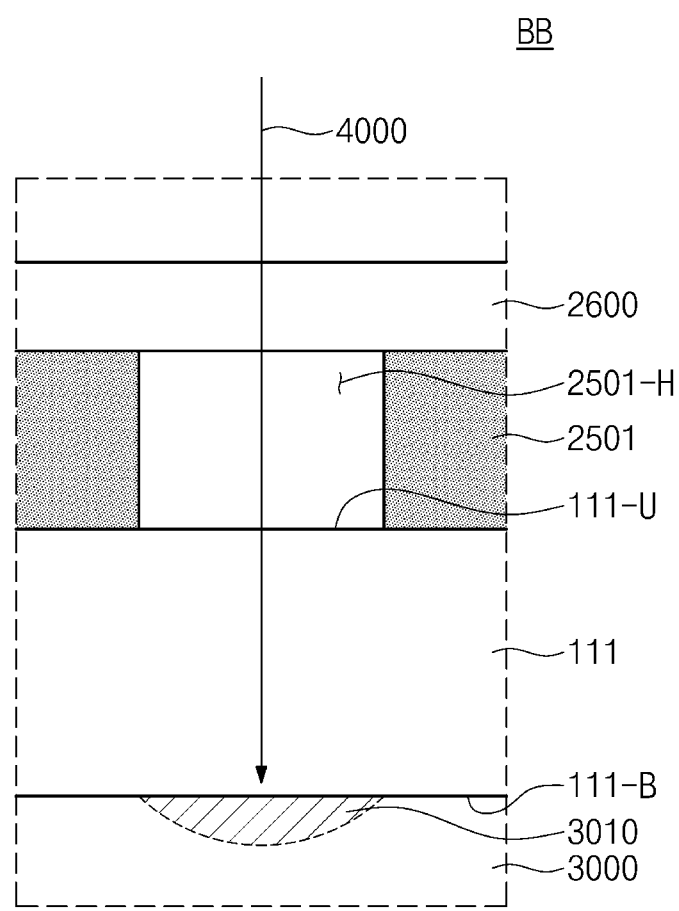
FIG. 10 illustrates a schematic cross-sectional view showing a substrate processing method according to an embodiment.

FIG. 10 illustrates a schematic cross-sectional view showing a substrate processing method according to an embodiment.

Referring to FIG. 10, the mask 2501 may contact the processing substrate 111. When the mask 2501 and the processing substrate 111 are in contact with each other, diffraction of the beam 4000 may become reduced and thus a precise patterning may be possible.

Figure 11:
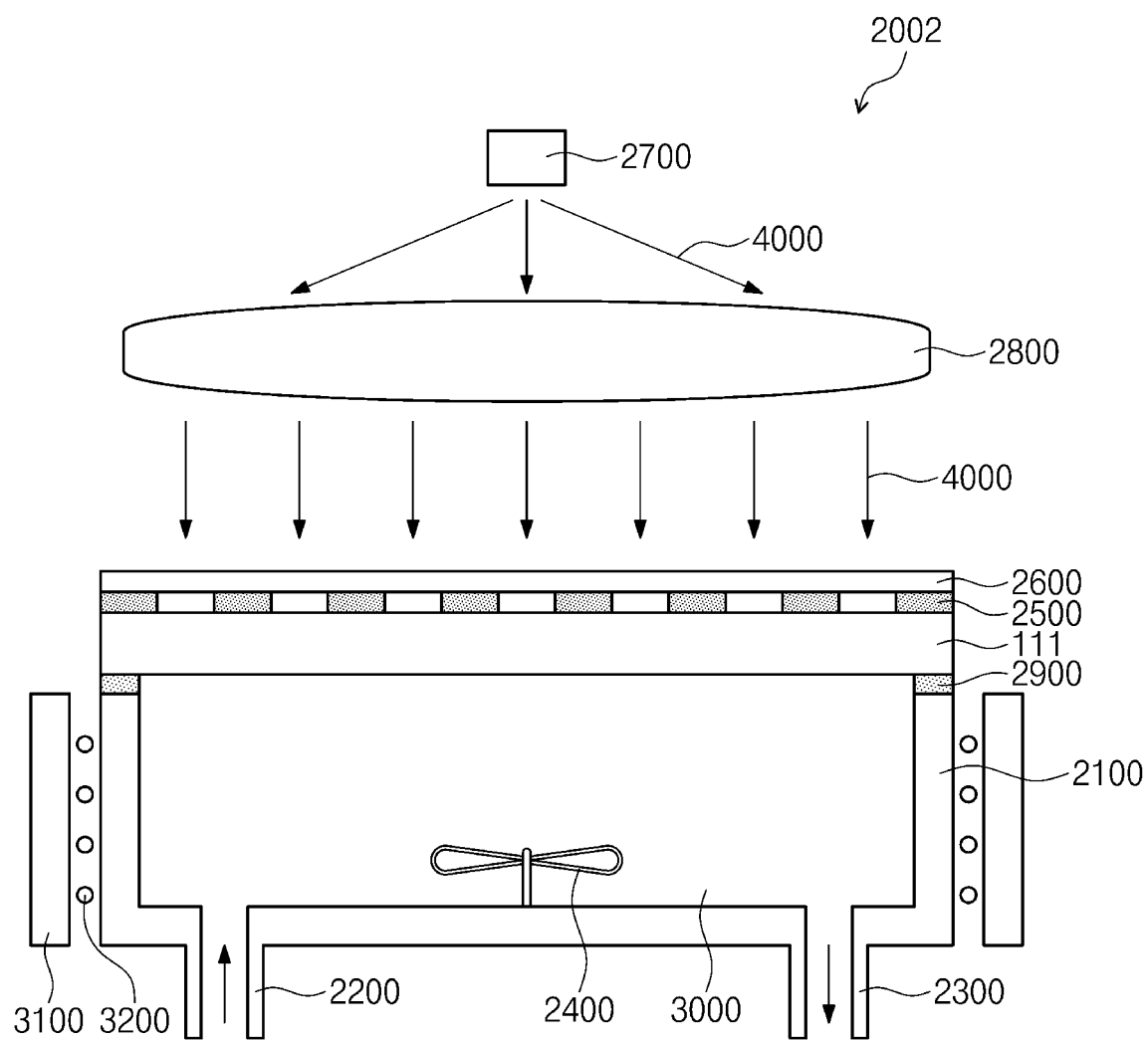
FIG. 11 illustrates a schematic diagram showing a substrate processing apparatus according to an embodiment.

FIG. 11 illustrates a schematic diagram showing a substrate processing apparatus according to an embodiment. In a following embodiment shown in FIG. 11, the same components as those of the embodiment illustrated in FIG. 6 are allocated the same reference numerals thereto, and explanation thereof will be omitted.

A substrate processing apparatus 2002 may include the vessel 2100, the solution supply 2200, the solution exhaust 2300, the rotator 2400, the mask 2500, the cover substrate 2600, the beam radiator 2700, the lens part 2800, an adiabatic part 3100, and a temperature controller 3200.

In an embodiment, the adiabatic part 3100 may be disposed substantially around the vessel 2100. For example, in order to control a temperature of the etching solution 3000, the adiabatic part 3100 may thermally insulate a perimeter of the vessel 2100.

The temperature controller 3200 may control the temperature of the etching solution 3000 disposed in the vessel 2100. When the etching solution 3000 is temperature controlled, it may be possible to stabilize or promote a processing speed of holes to be formed in the processing substrate 111.

In an embodiment, the temperature controller 3200 may be disposed adjacent to the vessel 2100. Alternatively, the temperature controller 3200 may be embedded in the vessel 2100. As an alternative, in contrast, the temperature controller 3200 may control a temperature of a chamber into which the substrate processing apparatus 2002 may be accommodated. In this case, the adiabatic part 3100 may be omitted.

According to embodiments, a processing substrate may have portions where holes will be formed, and a mask may not cover or overlap the portions of the processing substrate. The holes may be processed at the same time, and thus a processing speed may increase. Because the mask may specify or identify processing regions, it may be relatively possible to freely select size and wavelength of a beam to be irradiated to the processing substrate.

Furthermore, according to embodiments, a cover substrate may cover or overlap openings of the mask. Accordingly, even when a path may be formed along which an etching solution may flow from a bottom surface to a top surface of the processing substrate, the etching solution may be prevented from overflowing onto an upper portion of the mask.

Although the embodiments have been described with reference to a number of illustrative examples thereof, it will be understood by those of ordinary skill in the art that various changes in form and details may be made without departing from the spirit and scope of the disclosure as set forth in the following claims. Thus, the technical scope of the disclosure is not limited by the embodiments and examples described above.

What is claimed is:

1. A method of processing a substrate, comprising:
    placing a mask on a top surface of a processing substrate, the mask including a plurality of openings;
    placing a cover substrate on the mask, the cover substrate overlapping the plurality of openings of the mask;
    placing the processing substrate on a vessel that accommodates an etching solution; and
    irradiating a beam onto the top surface of the processing substrate to form a plurality of processing holes in the processing substrate, wherein
    a bottom surface of the processing substrate contacts the etching solution,
    the plurality of openings through holes penetrating a thickness of a mask, and
    the plurality of processing holes are through holes penetrating the thickness direction of the processing substrate.

2. The method of claim 1, wherein the etching solution includes an aromatic compound.

3. The method of claim 2, wherein
    the etching solution includes a halogen atom or a metal oxide,
    the halogen atom is a fluorine atom or a chlorine atom, and
    the metal oxide is cerium dioxide ($CeO_2$).

4. The method of claim 1, wherein the etching solution includes a compound including at least one of benzene, toluene, and naphthalene.

5. The method of claim 1, wherein the placing the mask comprises placing the mask directly on the processing substrate.

6. The method of claim 5, further comprising:
removing the mask after forming the plurality of processing holes.

7. The method of claim 1, wherein the placing the mask comprises placing the mask at a location that is spaced apart by a distance from the top surface of the processing substrate.

8. The method of claim 1, further comprising:
coupling the processing substrate to the vessel by a connecting member.

9. The method of claim 1, further comprising:
providing the vessel with the etching solution through a solution supply connected with the vessel; and
discharging the etching solution from the vessel through a solution exhaust connected with the vessel.

10. The method of claim 1, further comprising:
rotating a rotator installed in the vessel.

11. The method of claim 1, wherein the forming the plurality of processing holes comprises forming the plurality of processing holes from the bottom surface of the processing substrate toward the top surface of the processing substrate.

12. The method of claim 1, wherein
the beam is a pulse laser or a cyclotron radiation, and
the pulse laser is an excimer laser, a solid laser, a semiconductor laser, or an X-ray laser.

13. The method of claim 1, wherein
the cover substrate includes a material through which the beam passes, and
the mask includes a blocking material that blocks the beam, the blocking material including chromium.

14. The method of claim 1, further comprising:
controlling a temperature of the etching solution.

15. The method of claim 1, wherein
the openings in the processing substrate have a width in a range of about 10 microns to about 100 microns,
the openings in the processing substrate are produced by the beam heating, and
evaporating portions of the etching solution produce bubbles and shock waves that remove portions of a bottom surface of the processing substrate.

16. The method of claim 1, wherein
the placing the mask includes placing the mask in direct contact with the top surface of the processing substrate, and
the cover substrate to prevent the etching solution from overflowing onto a top surface of the mask.

17. A substrate processing apparatus, comprising:
a vessel that accommodates an etching solution;
a beam radiator disposed on the vessel that irradiates a beam;
a mask disposed between the vessel and the beam radiator, the mask including a plurality of openings and a blocking material that blocks the beam; and
a cover substrate disposed on the mask, the cover substrate overlapping the plurality of openings,
wherein the plurality of openings are through holes penetrating a thickness direction of the mask and allowing the passage of the beam.

18. The apparatus of claim 17, wherein the etching solution includes an aromatic compound, and at least one of a halogen atom and a metal oxide.

19. The apparatus of claim 17, further comprising:
a rotator disposed in the vessel.

20. The apparatus of claim 17, further comprising:
a solution supply connected with the vessel, the solution supply providing the vessel with the etching solution; and
a solution exhaust connected with the vessel, the solution exhaust discharging the etching solution from the vessel.

21. The apparatus of claim 17, wherein
the beam emitted from the beam radiator is a pulse laser or a cyclotron radiation, and
the pulse laser is an excimer laser, a solid laser, a semiconductor laser, or an X-ray laser.

22. The apparatus of claim 17, further comprising:
an adiabatic part disposed around the vessel; and
a temperature controller that controls a temperature of the etching solution.

* * * * *